United States Patent [19]

Eller

[11] Patent Number: 5,610,996

[45] Date of Patent: Mar. 11, 1997

[54] METHOD AND APPARATUS FOR ARC SEGMENTATION IN HANDWRITING RECOGNITION

[75] Inventor: Marlin J. Eller, Seattle, Wash.

[73] Assignee: Microsoft Corporation, Redmond, Wash.

[21] Appl. No.: 274,354

[22] Filed: Jul. 13, 1994

Related U.S. Application Data

[63] Continuation of Ser. No. 10,497, Jan. 28, 1993, abandoned, which is a continuation of Ser. No. 685,528, Apr. 15, 1991, abandoned.

[51] Int. Cl.$^6$ .................................................. G06K 9/00
[52] U.S. Cl. ................................................................ 382/187
[58] Field of Search ................................... 382/3, 9, 13, 48, 382/119, 173, 187, 282; 178/18–20

[56] References Cited

U.S. PATENT DOCUMENTS

| | | | |
|---|---|---|---|
| 3,133,266 | 5/1964 | Frishkopf | 382/13 |
| 3,295,105 | 12/1966 | Gray et al. | 382/48 |
| 3,609,685 | 9/1971 | Deutsch | 382/21 |
| 3,979,722 | 9/1976 | Sakoe | 382/21 |
| 4,013,999 | 3/1977 | Erwin et al. | 382/1 |
| 4,024,500 | 5/1977 | Herbst et al. | 382/173 |
| 4,034,341 | 7/1977 | Isono et al. | 382/1 |
| 4,097,847 | 6/1978 | Forsen et al. | 382/22 |
| 4,112,415 | 9/1978 | Hilbrink | 364/900 |
| 4,319,331 | 3/1982 | Elbaum et al. | 364/515 |
| 4,365,235 | 12/1982 | Greanias et al. | 382/13 |
| 4,375,081 | 2/1983 | Blesser | 364/724 |
| 4,415,880 | 11/1983 | Scott | 382/27 |
| 4,534,060 | 8/1985 | Ward | 382/13 |
| 4,550,438 | 10/1985 | Convis et al. | 382/232 |
| 4,558,461 | 12/1985 | Schlang | 382/9 |
| 4,562,304 | 12/1985 | Ward et al. | 382/13 |
| 4,575,751 | 3/1986 | Duschl | 382/22 |
| 4,653,107 | 3/1987 | Shojima et al. | 382/13 |
| 4,672,677 | 6/1987 | Yamakawa | 382/13 |
| 4,680,804 | 7/1987 | Kuzunuki et al. | 382/13 |
| 4,701,960 | 10/1987 | Scott | 382/13 |
| 4,731,857 | 3/1988 | Tappert | 382/9 |
| 4,817,034 | 3/1989 | Hardin, Sr. et al. | 382/13 |
| 4,878,249 | 10/1989 | Mifune et al. | 382/13 |
| 5,050,219 | 9/1991 | Maury | 382/3 |

FOREIGN PATENT DOCUMENTS

| | | | |
|---|---|---|---|
| 54-14633 | 3/1979 | Japan | G06K 9/00 |
| 55-138172 | 10/1980 | Japan | G06K 9/30 |
| 56-145472 | 11/1981 | Japan | G06K 9/46 |
| 57-130187 | 8/1982 | Japan | G06K 9/62 |
| 57-174779 | 10/1982 | Japan | G06K 9/62 |
| 58-3080 | 1/1983 | Japan | G06K 9/46 |
| 58-165181 | 9/1983 | Japan | G06K 9/62 |
| 60-126783 | 7/1985 | Japan | G06K 9/62 |
| 60-237580 | 11/1985 | Japan | G06K 9/62 |
| 61-13386 | 1/1986 | Japan | G06K 9/62 |
| 61-198381 | 9/1986 | Japan | G06K 9/62 |
| 62-160597 | 7/1987 | Japan | G06K 9/62 |
| 62-219089 | 9/1987 | Japan | G06K 9/46 |

OTHER PUBLICATIONS

Charles C. Tappert, Ching Y. Suen, and Toru Wakahara, "The State of the Art in On–Line Handwriting Recognition", Aug., 1990.

C. C. Tappert, "An Adaptive System for Handwriting Recognition", Research Report, May 21, 1985.

Michael F. Barnsley and Alan D. Sloan, "A Better Way to Compress Images", *Byte*, Jan. 1988.

*Primary Examiner*—Jose L. Couso
*Attorney, Agent, or Firm*—Seed and Berry LLP

[57] ABSTRACT

According to principles of the invention, a method and apparatus are provided that organizes sample text into a format that facilitates character recognition. Sample text is analyzed for those features that define characters. Features that represent useful data for character recognition are stored and analyzed but features not useful for character recognition can be discarded. The sample text is segmented into arcs at each Y-extrema. A center of gravity is calculated for each arc. The arc features are saved as descriptive of the sample text for use in character recognition.

4 Claims, 9 Drawing Sheets

METHOD AND APPARATUS FOR ARC SEGMENTATION IN HANDWRITING RECOGNITION

CROSS-REFERENCE TO RELATED APPLICATION

This application is a continuation of U.S. patent application Ser. No. 08/010,497, filed Jan. 28, 1993, now abandoned, which is a continuation of U.S. patent application Ser. No. 07/685,528, filed Apr. 15, 1991, now abandoned.

TECHNICAL FIELD

This invention is related to a method and apparatus for handwriting recognition, and more particularly, to the segmentation of input data into arcs or use in handwriting recognition.

BACKGROUND OF THE INVENTION

Computer recognition of handwritten characters has been attempted for many years. A reliable system for recognizing English language handwritten characters as they are written is not currently available.

The recognition of English-language handwritten characters as they are written, sometimes called "on-line recognition," presents considerable difficulties. The characters must be recognized at approximately the same rate they are written. Average writing rates are about 1.5–2.5 characters per second for printed English characters, and 5–10 characters or more per second for cursive writing. A reliable on-line recognition system must therefore be able to recognize up to 8–10 characters per second to keep up with a typical writer.

One of the major problems in recognizing handwritten text is that the handwriting includes features which identify a character and features which are peculiar to each person. Features which uniquely identify the characters must be analyzed for recognition; features that are peculiar to the individual's handwriting may be discarded. Sorting the character identification data from the particular writer's style is a problem yet to be efficiently solved by the prior art. Compounding this problem is the large amount of data available in a handwriting recognition system. A typical electronic tablet has a resolution of 200 points per inch, with a sampling rate ranging from sixty to several hundred points per second, thus providing large amounts of data. The data available for analysis can be increased by extracting information and calculating selected parameters from the input data. For example, the velocity of the writing instrument, the slope of the characters, the baseline of each word, the mid-zone of each word, the segmentation of the words and other features may be calculated, as described in U.S. Pat. No. 4,024,500, to Herbst et al., incorporated herein by reference. One problem in the prior art is identifying and saving the features that identify the character while discarding the features unique to each person's handwriting. If all of the collected data is used, the quantity is simply so great that the system is overwhelmed and on-line recognition cannot occur.

Various approaches have been attempted to extract features that identify the character and discard useless features. For example, some recognition systems require that the characters be boxed, discrete characters. Other systems permit spaced, printed characters. One system, described in U.S. Pat. No. 4,731,857, to Tappert, incorporated herein by reference, describes a system to aid in recognizing run-on, discretely written characters. Some systems attempt to recognize Chinese characters and rely on the inherent distinctiveness of the stroke order, see U.S. Pat. No. 4,365,235, to Greanias et al., incorporated herein by reference. Dynamic programming has been used to aid in improving the speed and likelihood of obtaining the correct match for character recognition. See, for example, U.S. Pat. No. 3,979,722, to Sakoe et al., incorporated herein by reference.

Some of the most difficult problems in on-line handwritten character recognition are presented by pure cursive scriptwriting, or the combination of mixed cursive, discrete, and run-on discrete characters. With these writing types, the character features useful for recognition vary from writer to writer and separation of character features from handwriting style features is difficult. As early as 1964, attempts were made to extract data from handwritten cursive text for use in recognizing the characters, as seen, for example, in the system described in U.S. Pat. No. 3,133,266. A recent article, which itself is not prior art to the present invention but cites articles which are prior art, describes various approaches in performing on-line handwritten character recognition, see "The State of the Art in On-Line Handwriting Recognition," by Charles Tappert et al., *IEEE Transactions on Pattern Analysis and Machine Intelligence* 12(8):787–808, August 1990.

A method and system for organizing the recorded data, retaining the important data and discarding the nonessential data would aid current recognition technology to output a correct match. Despite the extensive research and experimentation in the field of character recognition for cursive handwriting, a reliable system for extracting data to identify the character and discarding data peculiar to an individual does not exist today.

SUMMARY OF THE INVENTION

According to principles of the invention, a method and apparatus are provided that organize sample text into a format that facilitates character recognition. Sample text is analyzed for those features that define characters. Features that represent useful data for character recognition are stored and analyzed, but features not useful for character recognition can be discarded. The invention presents a data set that brings out the salient recognition features of characters in handwritten text to permit recognition of characters regardless of handwriting style.

According to principles of the invention, data is input from a data pad as sample text is written. The raw data is smoothed by removing multiple points having the same coordinates and averaging the location of points which are extremely close to each other. The smoothed data is segmented into a plurality of arcs, each arc having two end points. In one embodiment, the end points of the arc are the Y-extrema of the arc, one end point being a maximum Y value on the arc and the other end point being the minimum Y value of the arc. A center of gravity point for the arc is determined. The two end points and the center of gravity point are stored as a representation of the arc. The shape of the entire arc can be represented by these three points. The arc is marked as a visible arc or an invisible arc. The remaining data can be discarded.

The features of the sample text are represented by sufficiently few data points that recognition occurs very rapidly. A character is composed of two or three arcs on average, each arc being described by three data points. A few characters are composed of five or six arcs and some characters are composed of a single arc. Entire words, whether printed or cursive, can thus be represented using few data points and a correspondingly small amount of memory.

Recognition is carried out by comparing the data points representing the arcs of the sample text with the data points representing arcs in reference characters. Dynamic programming can be used in the comparison step to rapidly compare the arcs of the sample text to the arcs of the stored reference characters and select a best match. A code corresponding to the reference character which matches a character in the sample text is output.

An advantage of the present invention over the prior art is that the sample text is quickly analyzed and the features extracted to uniquely identify each character. Only the salient features, namely the arc features, are used in the comparison step, rather than using all of the data collected while the text is written. This provides the advantage that comparisons between the sample text and reference characters can be made very rapidly because relatively few data points are being compared.

According to one embodiment, the arcs begin and end at Y-extrema points on the sample text. This provides the advantage of limiting the number of arcs within the sample text while more clearly characterizing the features of each character that facilitate recognition. The data is thus provided in a simple form having the critical features extracted and the less useful features removed to facilitate recognition, the sample text being organized in a manner not provided in the prior art.

DETAILED DESCRIPTION OF THE INVENTION

Figure 12:
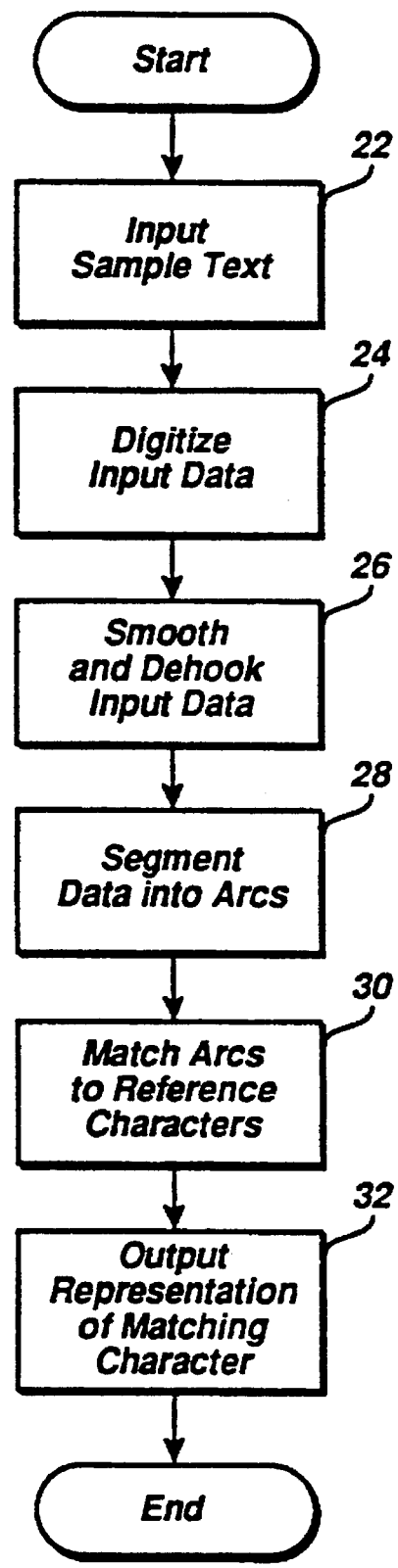
FIG. 12 is a flow chart illustrating the general process for carrying out recognition according to the invention.

The flow chart of FIG. 12 shows the main steps for carrying out the principles of the invention. Sample text is input in step 22 and digitized in step 24. The data is smoothed and de-hooked in step 26, and segmented into arcs in step 28. In step 30, the recognition of the characters is performed and a representation of the matching characters is output in step 32. The hardware for carrying out the invention and each step will now be explained in more detail.

Figure 7:
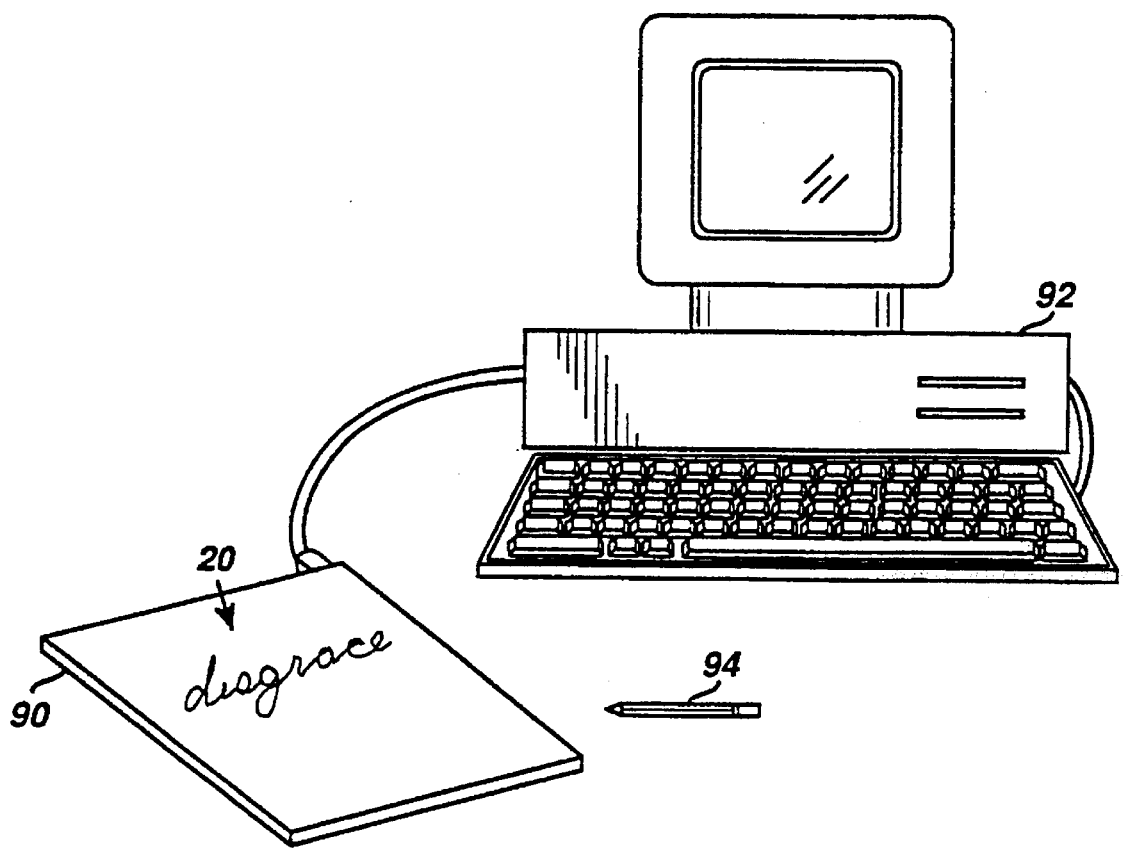
FIG. 7 is an isometric view of an apparatus for carrying out the invention.
Figure 8:
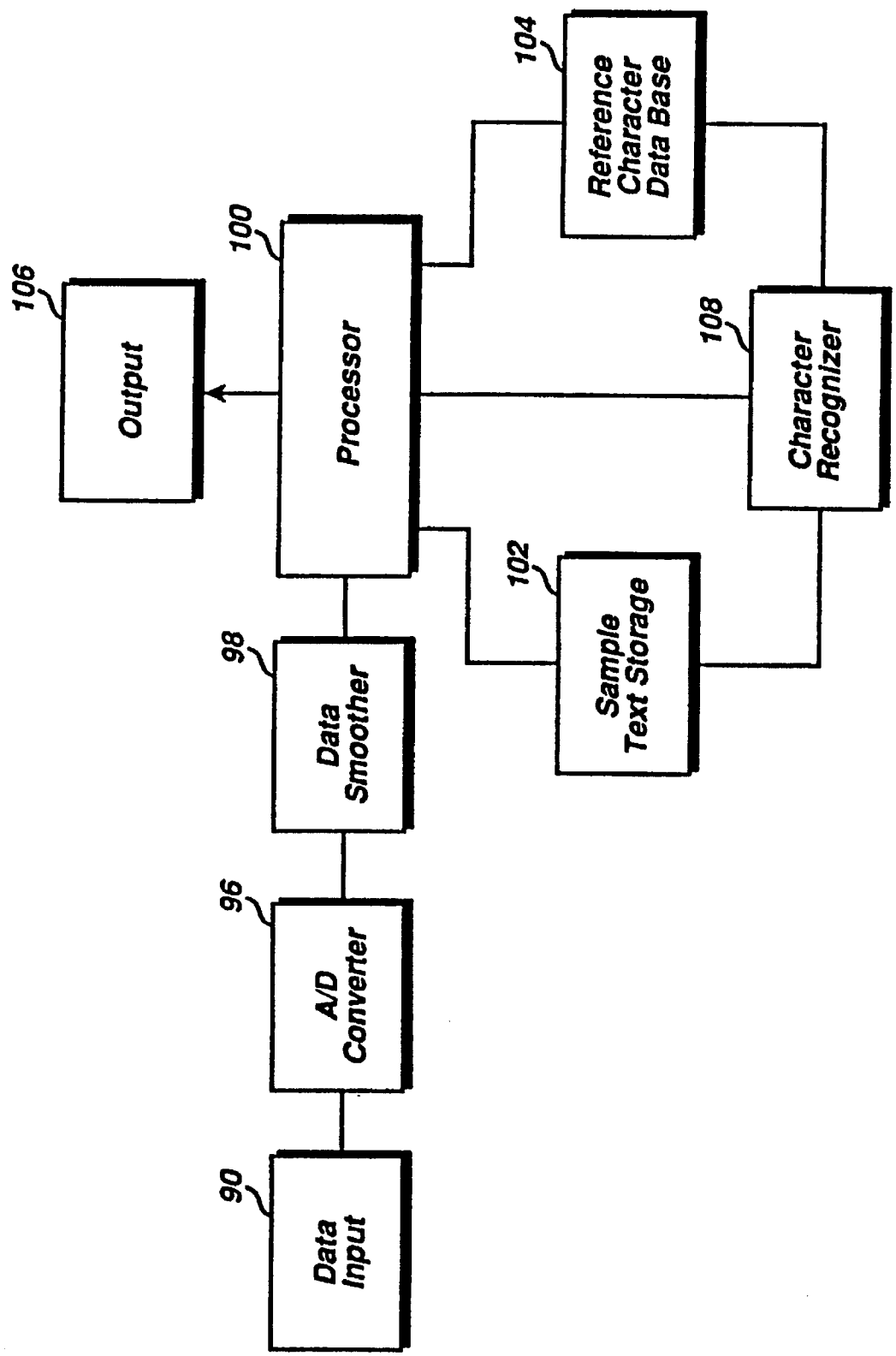
FIG. 8 is a block diagram of a circuit for carrying out the arc segmentation and recognition according to principles of the invention.

FIGS. 7 and 8 illustrate an apparatus for carrying out handwritten text recognition according to principles of the invention. As illustrated in FIG. 7, a digitizing tablet 90 is connected to a computer 92 having a digital memory and microprocessor. A writing instrument 94, such as a pen, is provided for a user to record the sample text 20 onto the digitizing tablet 90. The digitizing tablet 90 may be any suitable tablet available on the open market which outputs the coordinates of a pen in contact with the digitizing tablet. The pen 94 may be a simple stylus and the pen up and pen down positions are sensed by contact with the digitizing tablet 90. Alternatively, the writing instrument 94 may be electrically coupled to the digitizing tablet 90 or the computer 92 for providing pen up and pen down positions based on the tip of the writing instrument being depressed, such writing instruments being well known in the art. In one embodiment, the computer 92 is a standard personal computer available on the open market. A personal computer having an Intel 80386 or 80486 microprocessor and sufficient onboard RAM and disk space is suitable.

FIG. 8 illustrates a functional block diagram of the sample text segmentation and recognition circuit. Data is input from the digitizing tablet 90 to the A to D convertor 96. In some embodiments, the A to D convertor 96 is contained within the digitizing tablet 90, the output from the digitizing tablet 90 providing the coordinates in digital format. The processor 100 controls the data smoothing function 98 to smooth and de-hook the data as it is received, using the techniques described herein. The processor 100 segments the sample text into arcs, determines the center of gravity of each arc, and inputs the arc features into the sample text storage 102, as described in detail elsewhere herein. According to one embodiment of the invention, the processor 100 also saves the raw data and the smoothed data in the sample text storage 102, in addition to saving the arc data points. The smoothed data may be useful to the character recognizer for performing recognition of some special types of characters. The character recognizer 108 operates under the control of processor 100 to perform recognition of the sample text by comparing the arc features with reference character data from database 104.

Figure 1:
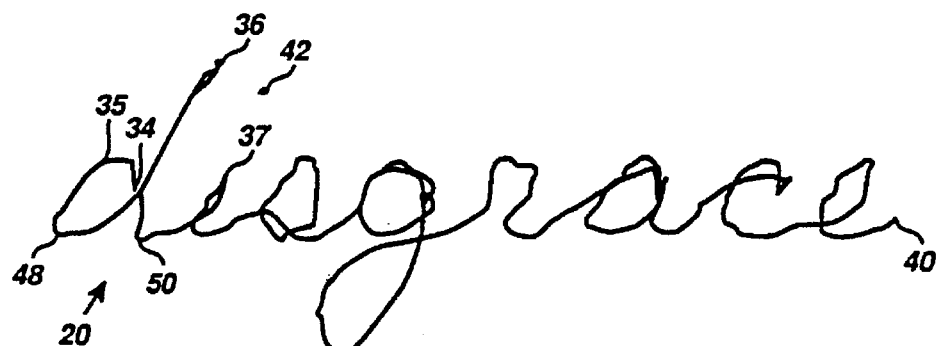
FIG. 1 is an example of sample text constructed from raw digital data.

FIG. 1 illustrates the sample text 20 as the word "disgrace" constructed from raw digital data input on an X-Y data tablet. Raw data from a digitizing tablet consists of a stream of periodically sampled X and Y coordinate points of the pen's position on the tablet.

A user inputs the sample text by writing on a digitizing tablet with a pen. When the pen is in contact with the digitizing tablet, the X and Y coordinate points of the pen are digitized and output to a computer. An acceptable sampling rate is 120 points per second. Sampling rates in the range of 70–180 points per second have been found suitable for use in conjunction with the preferred embodiments described herein. Following in Table 1 is the raw data recorded on the digitizing tablet at 80 points per second for the word "disgrace," as shown in FIG. 1.

TABLE 1

RAW DATA

| | | | | | | | |
|---|---|---|---|---|---|---|---|
| 500 | 174 | 538 | 117 | 537 | 177 | 572 | 194 |
| 500 | 174 | 538 | 117 | 534 | 178 | 566 | 197 |
| 500 | 173 | 535 | 120 | 532 | 184 | 563 | 194 |
| 500 | 173 | 535 | 124 | 529 | 186 | 562 | 191 |
| 500 | 168 | 530 | 129 | 527 | 189 | 558 | 188 |
| 499 | 168 | 524 | 137 | 527 | 191 | 558 | 184 |
| 499 | 166 | 517 | 148 | 528 | 193 | 558 | 184 |
| 499 | 162 | 513 | 157 | 531 | 194 | 558 | 184 |
| 494 | 161 | 508 | 168 | 534 | 195 | 560 | 184 |
| 490 | 161 | 503 | 178 | 540 | 193 | 559 | 184 |
| 487 | 162 | 503 | 186 | 546 | 190 | 562 | 186 |
| 480 | 166 | 503 | 188 | 550 | 187 | 566 | 189 |
| 475 | 172 | 501 | 192 | 555 | 186 | 568 | 191 |
| 469 | 182 | 501 | 195 | 558 | 182 | 572 | 194 |
| 465 | 186 | 502 | 198 | 563 | 179 | 573 | 196 |
| 464 | 190 | 502 | 198 | 568 | 170 | 581 | 196 |
| 464 | 194 | 507 | 197 | 573 | 165 | 587 | 194 |
| 467 | 196 | 511 | 195 | 575 | 161 | 589 | 193 |
| 475 | 195 | 521 | 193 | 578 | 160 | 595 | 190 |
| 484 | 192 | 525 | 191 | 581 | 160 | 598 | 188 |
| 492 | 188 | 531 | 187 | 581 | 162 | 603 | 184 |
| 500 | 181 | 535 | 184 | 583 | 166 | 605 | 178 |
| 506 | 171 | 539 | 178 | 584 | 170 | 606 | 176 |
| 514 | 155 | 541 | 171 | 584 | 177 | 609 | 169 |
| 523 | 138 | 541 | 167 | 584 | 185 | 613 | 168 |
| 530 | 125 | 540 | 167 | 584 | 186 | 618 | 166 |
| 535 | 120 | 540 | 167 | 582 | 190 | 625 | 166 |
| 536 | 117 | 540 | 170 | 577 | 192 | 631 | 168 |
| 633 | 171 | 610 | 203 | 737 | 175 | 792 | 175 |
| 635 | 171 | 616 | 200 | 737 | 175 | 792 | 175 |
| 635 | 176 | 623 | 199 | 737 | 176 | 792 | 175 |
| 633 | 175 | 630 | 197 | 737 | 176 | 793 | 173 |
| 630 | 180 | 635 | 196 | 737 | 169 | 793 | 170 |
| 630 | 179 | 642 | 194 | 737 | 167 | 793 | 165 |
| 630 | 179 | 647 | 192 | 737 | 163 | 793 | 161 |
| 630 | 179 | 651 | 189 | 735 | 160 | 790 | 160 |
| 630 | 177 | 655 | 186 | 733 | 159 | 788 | 160 |
| 631 | 175 | 659 | 184 | 729 | 160 | 784 | 161 |
| 631 | 172 | 661 | 179 | 727 | 162 | 777 | 164 |
| 629 | 169 | 661 | 177 | 723 | 165 | 773 | 170 |
| 628 | 166 | 661 | 176 | 719 | 169 | 773 | 175 |
| 624 | 162 | 661 | 170 | 713 | 177 | 769 | 178 |
| 622 | 162 | 661 | 166 | 708 | 184 | 767 | 185 |
| 617 | 162 | 663 | 163 | 707 | 187 | 767 | 187 |
| 614 | 165 | 664 | 160 | 705 | 188 | 773 | 190 |
| 611 | 169 | 667 | 160 | 708 | 191 | 775 | 193 |
| 607 | 175 | 671 | 160 | 713 | 192 | 779 | 194 |
| 605 | 182 | 676 | 163 | 718 | 192 | 783 | 194 |
| 605 | 187 | 680 | 163 | 725 | 191 | 790 | 194 |
| 605 | 189 | 682 | 163 | 730 | 190 | 793 | 192 |
| 607 | 192 | 682 | 163 | 734 | 186 | 798 | 191 |
| 611 | 194 | 684 | 164 | 737 | 182 | 802 | 189 |
| 617 | 194 | 681 | 169 | 738 | 179 | 806 | 189 |
| 626 | 191 | 679 | 172 | 740 | 171 | 812 | 189 |
| 630 | 187 | 679 | 175 | 741 | 169 | 818 | 188 |
| 632 | 181 | 678 | 179 | 741 | 169 | 822 | 186 |
| 634 | 180 | 675 | 182 | 740 | 170 | 824 | 182 |
| 634 | 175 | 671 | 185 | 739 | 173 | 827 | 182 |
| 634 | 175 | 669 | 185 | 738 | 177 | 831 | 177 |
| 631 | 175 | 667 | 189 | 737 | 182 | 832 | 171 |
| 635 | 182 | 668 | 191 | 735 | 186 | 832 | 168 |
| 632 | 186 | 670 | 194 | 735 | 188 | 832 | 164 |
| 632 | 191 | 674 | 196 | 738 | 190 | 835 | 161 |
| 630 | 198 | 678 | 196 | 738 | 193 | 836 | 161 |
| 628 | 209 | 681 | 195 | 743 | 193 | 833 | 160 |
| 622 | 219 | 684 | 193 | 747 | 192 | 830 | 162 |
| 615 | 228 | 687 | 191 | 752 | 190 | 825 | 164 |
| 609 | 239 | 688 | 188 | 752 | 189 | 821 | 167 |
| 603 | 244 | 692 | 186 | 754 | 187 | 819 | 173 |
| 600 | 248 | 694 | 184 | 757 | 185 | 813 | 179 |
| 598 | 248 | 699 | 182 | 758 | 181 | 813 | 184 |
| 596 | 249 | 705 | 179 | 763 | 178 | 812 | 189 |
| 592 | 248 | 711 | 175 | 768 | 173 | 813 | 192 |
| 592 | 248 | 723 | 168 | 773 | 171 | 821 | 194 |
| 586 | 244 | 731 | 166 | 779 | 170 | 825 | 194 |
| 585 | 239 | 736 | 164 | 785 | 167 | 833 | 192 |
| 584 | 232 | 738 | 164 | 791 | 167 | 841 | 190 |

TABLE 1-continued

RAW DATA

| | | | | | | | |
|---|---|---|---|---|---|---|---|
| 585 | 225 | 739 | 164 | 797 | 168 | 846 | 186 |
| 587 | 220 | 739 | 166 | 797 | 169 | 558 | 142 |
| 591 | 215 | 737 | 170 | 797 | 171 | 558 | 142 |
| 597 | 211 | 737 | 173 | 793 | 173 | 558 | 142 |
| 602 | 207 | 737 | 175 | 793 | 176 | | |

The data points listed in Table 1 are expressed by the X and Y coordinates of the point, the first number being the X coordinate and the second number being the Y coordinate. The first data point 34 at pen down (see FIG. 1) is at X=500 and Y=174. X values increase from left to right and Y values increase from top to bottom. Minimum Y values are at the top of the character, rather than at the bottom, on this particular digitizing tablet. If desired, the coordinate systems could be reversed with Y increasing from bottom to top. However, any suitable direction for increasing or decreasing for the X or Y value is acceptable. As the pen moves upward and to the left as the character "d" is written, the X coordinate value decreases and the Y coordinate value decreases.

As the user writes the sample text, the coordinates of the pen are digitized and output. Salient features of the sample text can be seen in the raw data. For example, the top of the curve on the letter "d" near point 35 has coordinates of 490,161, and the bottom point 48 is at 475,195. The uppermost part 36 of the "d" can be seen as 538,117, point 50 on the ligature between the "d" and "i" is at 502,198, the top 37 of the letter "i" (excluding the dot) as 540,167, and the bottom portion 38 of the letter "g" can be found in the point whose Y coordinate has the highest value in the sample text, 596,249. The ending 40 of the visible sample test is at 846,186, and the dot 42 on the letter "i" is at point 558,142. The dot on the letter "i" was not data collected on this data pad, rather, its location was measured, the data point determined, the point coordinates stored in the appropriate computer memory, and treated like collected data. All references herein to that dot and arcs formed therefrom are therefore based on this traced data as if it were collected data, the results being the same as if it were collected. This is an example of generating data from a trace after the character is written, and treating it like data collected as the character is written for recognition purposes, as later described herein. Generally, the dot on an "i" and the cross of A "t" or an "x" will be part of the collected data. This, of course, depends on the style of the writer and the data collection techniques selected.

The presence of multiple coordinate points and jitter in the data can be seen from the raw data of Table 1. Pen motion tends to be slower at the start and end of each stroke and also at cusps, where the pen changes direction. Consequently, the data points are more closely spaced at these positions and the character also contains jitter. The start of a stroke is particularly prone to exhibit a superfluous hook, where the pen starts off in some random direction before the real beginning of the character. For example, the starting point 34 includes two data points having the same coordinates, 500,174. Similarly, the top of the letter "i", 37, includes two data points having the same coordinates, 540, 167. To improve the recognition and filter unnecessary data, the raw data is preferably smoothed. Many different techniques for smoothing raw data input from a digitizing tablet are presently available in the art. Many of these prior art techniques are suitable for use in conjunction with this invention. One smoothing and de-hooking technique has been found particularly useful as one aspect of this invention, as will now be described.

Figure 2:
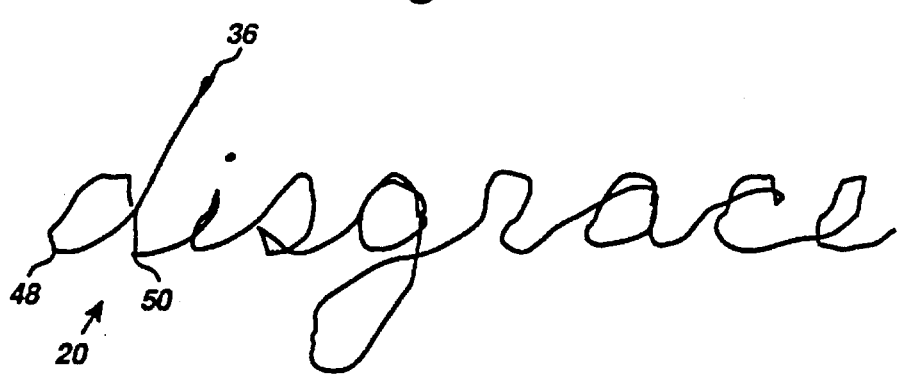
FIG. 2 is the sample text of FIG. 1 constructed from smoothed digital data.

FIG. 2 illustrates the sample text 20 as represented by points after a de-hooking and smoothing procedure according to one embodiment of the invention. Local jitter and minor hooks are not present in the data to be analyzed, as can be seen by comparing FIG. 2 to FIG. 1. In a first smoothing pass of the data, all duplicate points are removed. For example, all but one of the data points collected at the start 34 of the text, at the top 36 of the letter "d", and at other locations, are removed.

The de-hooking and smoothing procedure then clusters points that are near one another by replacing each cluster with a single point at the center of gravity of the cluster. The coordinates of the center of gravity of each cluster are saved as the digital data representing the character.

Clusters are condensed into a single point at their center of gravity as follows. Checking begins at a single data point; each point is initially considered a single-point cluster. The adjacent point of the single point is checked to determine if it is within a prescribed threshold value $\epsilon$ of the center of gravity of the preselected cluster. (In one embodiment, "$\epsilon$" is 4). Because the point is initially considered a cluster by itself, the first comparison is performed between a single point and the subsequent adjacent point. If the adjacent point is not within $\epsilon$, they are not within the same cluster and testing proceeds to the next point. If the adjacent point is within the distance $\epsilon$, they are considered to be within the same cluster and their coordinates are averaged into the coordinates of the cluster's center of gravity. The center of gravity of the cluster is thus formed having its position as the averaged location of those adjacent points.

The location of the next adjacent point is then compared to this center of gravity to determine if it is located within a distance $\epsilon$ of the center of gravity of the cluster. If it is located within $\epsilon$ of the center of gravity of the cluster, it is considered to be within the cluster and its position is averaged into the center of gravity to form a new center of gravity for the cluster. However, if the next point is more than the distance $\epsilon$ from the center of gravity of the cluster, it is part of a different cluster. Each cluster is represented by a single point at its center of gravity determined as just described.

Averaging of points is performed by summing the X values of the coordinates together and dividing by the number of coordinates to obtain the X value of the center of gravity coordinate. The Y values of the coordinates are summed and divided by the number of coordinates to obtain the Y value of the center of gravity coordinate.

In the preferred embodiment described herein, the value of $\epsilon$ is set to be less than the space between points in regions where the pen is moving normally. Most clusters will therefore be single points of data output from the X-Y data tablet. Generally, only data near the starting or turning points are averaged into clusters and represented as a single point. This technique of smoothing the raw data has been found particularly useful in preparing the data for segmentation into arcs, according to the principles of the invention. Thus, while other approaches of smoothing data may also be suitable, the just described approach of a smoothing procedure forms one embodiment of the invention.

Table 2 is the smoothed data from the raw data of Table 1 according to the just described technique.

TABLE 2

| \multicolumn{8}{c}{SMOOTHED DATA} | | | | | | | |
|---|---|---|---|---|---|---|---|
| 500 | 174 | 506 | 171 | 509 | 196 | 558 | 182 |
| 499 | 167 | 514 | 155 | 523 | 192 | 563 | 179 |
| 499 | 162 | 523 | 138 | 531 | 187 | 568 | 170 |
| 492 | 161 | 530 | 125 | 535 | 184 | 574 | 163 |
| 487 | 162 | 536 | 118 | 539 | 178 | 580 | 161 |
| 480 | 166 | 535 | 124 | 540 | 168 | 584 | 168 |
| 475 | 172 | 530 | 129 | 536 | 178 | 584 | 177 |
| 469 | 182 | 524 | 137 | 530 | 185 | 583 | 187 |
| 464 | 188 | 517 | 148 | 528 | 192 | 577 | 192 |
| 466 | 195 | 513 | 157 | 534 | 195 | 572 | 194 |
| 475 | 195 | 508 | 168 | 540 | 193 | 564 | 196 |
| 484 | 192 | 503 | 178 | 546 | 190 | 562 | 191 |
| 492 | 188 | 503 | 187 | 550 | 187 | 559 | 185 |
| 500 | 181 | 502 | 196 | 555 | 186 | 567 | 190 |
| 572 | 195 | 665 | 161 | 792 | 193 | | |
| 581 | 196 | 671 | 160 | 800 | 190 | | |
| 588 | 194 | 681 | 163 | 806 | 189 | | |
| 596 | 189 | 680 | 172 | 812 | 189 | | |
| 603 | 184 | 676 | 180 | 820 | 187 | | |
| 606 | 177 | 670 | 185 | 826 | 182 | | |
| 611 | 168 | 668 | 191 | 831 | 177 | | |
| 618 | 166 | 676 | 196 | 832 | 170 | | |
| 625 | 166 | 682 | 194 | 833 | 162 | | |
| 633 | 170 | 688 | 190 | 825 | 164 | | |
| 634 | 176 | 693 | 185 | 821 | 167 | | |
| 630 | 178 | 699 | 182 | 819 | 173 | | |
| 629 | 169 | 705 | 179 | 813 | 179 | | |
| 623 | 162 | 711 | 175 | 813 | 184 | | |
| 616 | 164 | 723 | 168 | 812 | 190 | | |
| 611 | 169 | 731 | 166 | 823 | 194 | | |
| 607 | 175 | 738 | 164 | 833 | 192 | | |
| 605 | 182 | 737 | 174 | 841 | 190 | | |
| 606 | 189 | 737 | 168 | 846 | 186 | | |
| 611 | 194 | 735 | 161 | 558 | 142 | | |
| 617 | 194 | 728 | 161 | | | | |
| 626 | 191 | 723 | 165 | | | | |
| 630 | 187 | 719 | 169 | | | | |
| 633 | 180 | 713 | 177 | | | | |
| 633 | 175 | 707 | 188 | | | | |
| 635 | 182 | 713 | 192 | | | | |
| 632 | 186 | 718 | 192 | | | | |
| 632 | 191 | 725 | 191 | | | | |
| 630 | 198 | 730 | 190 | | | | |
| 628 | 209 | 734 | 186 | | | | |
| 622 | 219 | 738 | 180 | | | | |
| 615 | 228 | 740 | 170 | | | | |
| 609 | 239 | 738 | 177 | | | | |
| 603 | 244 | 736 | 185 | | | | |
| 598 | 248 | 738 | 192 | | | | |
| 592 | 248 | 745 | 192 | | | | |
| 586 | 244 | 753 | 189 | | | | |
| 585 | 239 | 758 | 183 | | | | |
| 584 | 232 | 763 | 178 | | | | |
| 585 | 225 | 768 | 173 | | | | |
| 587 | 220 | 773 | 171 | | | | |
| 591 | 215 | 779 | 170 | | | | |
| 597 | 211 | 785 | 167 | | | | |
| 602 | 207 | 791 | 167 | | | | |
| 610 | 203 | 797 | 169 | | | | |
| 616 | 200 | 793 | 174 | | | | |
| 623 | 199 | 791 | 162 | | | | |
| 630 | 197 | 784 | 161 | | | | |
| 635 | 196 | 777 | 164 | | | | |
| 642 | 194 | 773 | 170 | | | | |
| 647 | 192 | 773 | 175 | | | | |
| 651 | 189 | 769 | 178 | | | | |
| 657 | 185 | 767 | 186 | | | | |
| 661 | 177 | 774 | 192 | | | | |
| 661 | 168 | 781 | 194 | | | | |

The results of the smoothing procedure can be seen by comparing Table 2 to Table 1. The duplicate points at 500,174, and 500,173 were discarded. The remaining two points, 500,174, and 500,173, were grouped as a single cluster having its center of gravity at 500,174. When the average location of the center of a cluster is not an integer, the number is rounded to the nearest integer, using acceptable rounding techniques. The next point, 500,168, is greater than the distance $\epsilon$ away from the center of the prior cluster, and thus is part of a different cluster. For the above sample text, 4 has been selected for the value of $\epsilon$. That is, all points within four units of another point are considered sufficiently close to be within a single cluster and all points greater than four units from each other are considered sufficiently spaced to be within a different cluster. For example, points 500,168; 499,168; and 499,166 are within a single cluster having a center of gravity of 499,167, the next point in the smoothed data. Interestingly, the smoothed data contains points not in the raw data. For example, point 499,167 is a point in the smoothed data that was not within the raw data. The next point in the raw data, 499,162, is greater than $\epsilon$ from the center of gravity of the prior cluster and forms a new cluster. The next point, 494,161, is greater than $\epsilon$ from all adjacent points and therefore forms a new, single-point cluster. The smoothing of the data by averaging the next adjacent point into the center of gravity of the cluster if it is within $\epsilon$ of that center of gravity continues for the entire sample text as it is received.

The smoothing of the raw data occurs very rapidly, just as the data is received. The computer is able to analyze data, average the data to the center of each clusters and store the coordinates of the center of the gravity of the cluster at a rate much faster than the data is being input. As the sample text is input, the data has been completely smoothed, stored, and is ready for further manipulation. According to one embodiment of the invention, the raw data is saved for possible future use.

Figure 3:
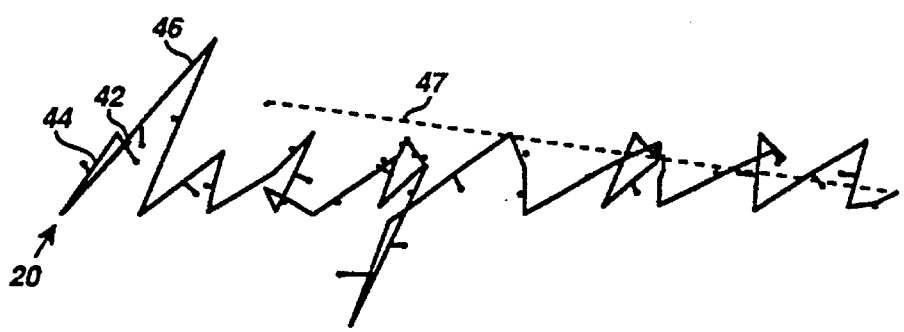
FIG. 3 is the sample text of FIG. 1 represented in arcs having each arc represented as a straight line and the center of gravity represented as a point having a straight line extending to it from the midpoint between the two end points.

FIG. 3 illustrates the sample text 20 segmented into a plurality of arcs. The arcs are represented by a point at each end of the arc and a single point at the center of gravity of the arc. For illustration purposes, a straight arc line has been drawn between the two end points of the arc. A straight line has also been drawn from the center of the arc line to the center of gravity point. The data on the straight line is not part of the recognition data and is provided here to permit a reader to more easily see the starting and ending points of each arc. The arc may be a visible arc corresponding to the pen moving while in contact with the tablet, as represented by the solid line. Alternatively, the arc may be an invisible arc corresponding to the pen moving while not in contact with the digitizing tablet as represented by a dashed line. The segmentation of the character into arcs and the representation of those arcs as data points forms a useful aspect of the invention, as will now be explained in more detail.

Figure 13:
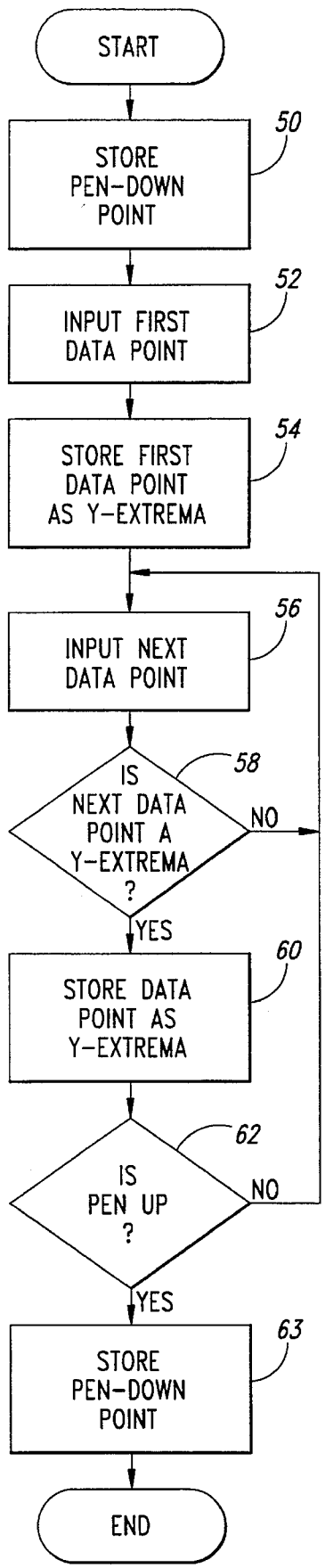
FIG. 13 is a flow chart illustrating the selecting and storing of the Y-extrema.

The flow chart of FIG. 13 illustrates how the sample text is segmented into a plurality of arcs. At the beginning of the sample text, point 34, the pen down point is stored, step 50 (see FIG. 3). The smoothed data, that shown in Table 2, is then received as the input data, step 52. This first data point is saved as the first point in the beginning of the first arc, step 54.

According to one embodiment of the invention, the data is segmented into arcs at each Y-extrema in the sample text. Arc end points occur at the Y-extrema points of the sample text. That is, each maximum Y value becomes one end point of an arc and the adjacent minimum Y value is the other end point of the same arc. Each data point is tested, step 58, to determine if it is a Y-extrema, that is a Y-maximum or Y-minimum value. If the point is not a Y-extrema, it is determined to be an internal point of an arc and the next point is considered to determine whether it is a Y-extrema. If the point is determined to be a Y-extrema, it is stored as the end point of an arc, step 60.

The sample text is segmented into arcs having a first end point at one Y-extrema and the other end point at the opposite Y-extrema, one point being at a maximum Y on the sample text and the other point being at a minimum Y on the sample text. If the sample text is written with the pen down, a flag is set to mark the arc as a visible arc. If the pen is up, the arc is invisible.

An invisible arc is defined as an arc made with the pen not in contact with the digitizing tablet. An arc is determined as invisible if the pen is up for the first point in the arc and down for the last point in the arc, as tested by steps 50 and 62 of FIG. 13. If the pen is up, as indicated in step 62 of FIG. 13, the digitizing tablet does not output any coordinates until the pen is down on a coordinate of the digitizing tablet, and then the pen down coordinate is output together with an indication that it is the pen down coordinate. An invisible arc has as its beginning point the pen up coordinate and as its ending point the pen down coordinate. The invisible arc will necessarily be a straight line, because it is composed of only two points, the beginning point and the ending point, there being no data coordinate points in between the two because the pen is not in contact with the digitizing tablet. Arc 47 of FIG. 3 is an example of an invisible arc having as its beginning point the end of the letter "e" and as its end point the dot of the letter "i". The invisible arc is illustrated as a dotted line in FIG. 3 to distinguish it from the visible arcs.

The test of whether a data point is a Y-extrema, FIG. 13, step 58, can be performed by any acceptable technique. One acceptable technique is to store the Y coordinate of the most recent Y minimum value and the Y coordinate of the most recent Y maximum value in respective Y maxima and Y minimum registers. If the most recent Y-extrema is a Y minimum value, the next Y-extrema being sought will be a Y maximum value. The logic enters a loop seeking a Y maximum value. As each end point is received, the value of the Y coordinate is compared to the value in the Y maximum register. If the value of the Y coordinate is greater than that presently in the register, the value of the Y coordinate in the Y maximum register is replaced by the most recently received Y coordinate value. The comparison continues with each succeeding Y value replacing the current value in the Y maximum register until the subsequent data point is not greater. The number then stored in the register will be the Y maximum value and the segmentation point for an end of the arc. The coordinates of that data point are saved appropriately. The logic now enters a loop seeking for a Y minimum value, storing points in the Y minimum register and comparing subsequent points to the stored points. Using this technique, the Y maximum and minimum values are obtainable and stored in the appropriate register for transferring to the arc segmentation database to mark the beginning and end points of each arc and sample text.

A second, alternative method may also be used to locate the Y-extrema in the sample text. In this method, the first point of the pen down is stored as the first data point of the Y-extrema in step 54 of FIG. 3. The Y value of the next point is compared to the point stored in step 54. If a subsequent point has a higher Y coordinate, the first point is considered a Y minimum value, and labeled as such. The program then enters a Y maximum value searching mode. Each of the input points is sampled and saved. Each point is compared to the previous point and to the subsequent point. When the Y value of a point is greater than or equal to the Y value of the prior adjacent point, and also greater than the Y value of the next adjacent point, that point is labeled a Y maximum coordinate point and an arc segmentation point, as described. Searching then begins for a Y minimum point by similarly testing each prior and subsequent input points using the same technique. That is, if the Y value of a particular input point is less than or equal to the adjacent prior previous point and is less than the adjacent subsequent point, then this point is labeled a Y minimum. This second technique of comparing a particular point to the coordinates on either side to confirm that the point is a Y-extrema, whether a maximum or a minimum, has also been found suitable for establishing whether a point is a Y-extrema as carried out in step 58 of FIG. 13.

The text may also be segmented at other points besides at the Y-extrema. For example, the sample text may be segmented into arcs at the X-extrema, or at both the Y- or X-extrema. Arcs may be created by segmenting at different locations to bring out particular features for character recognition. For example, the arcs may be created at each ligature or at each midpoint of a character. Alternatively, arcs may be segmented at each pen-up and each pen-down. In one preferred embodiment described herein, the sample text is segmented into arcs at the Y-extrema and each end point of an arc is a maximum or minimum Y value on the arc for cursive, printed, or mixed cursive and printed English text. This segmentation has been found useful to bring out the features needed for character recognition of English text and the like.

Figure 14:
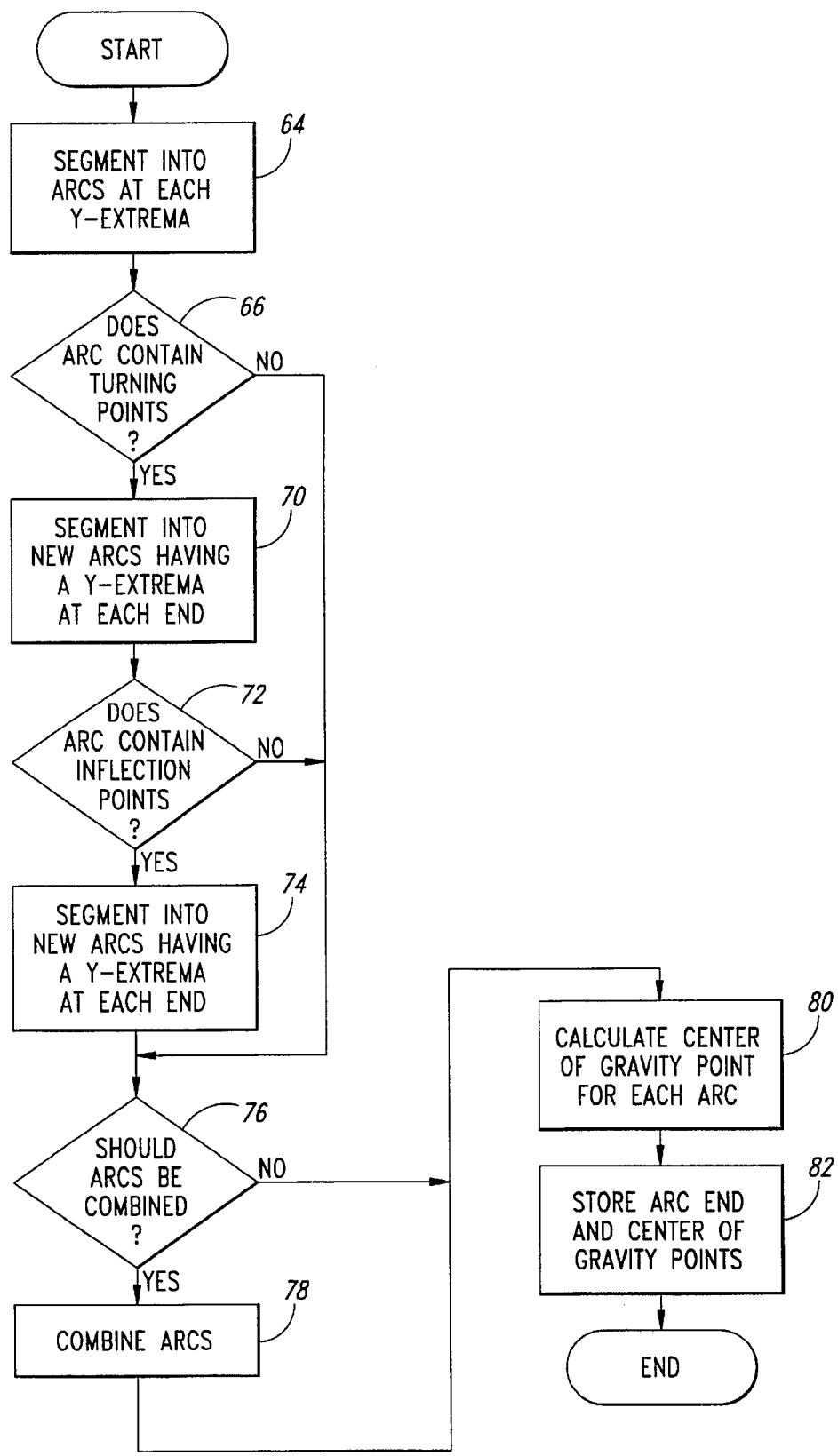
FIG. 14 is a flow chart illustrating segmenting the sample text into arcs, calculating the arc features, and storing the arc data.

FIG. 14 shows the steps in further segmenting the text into arcs in accordance with the preferred embodiment described herein. Each Y-extrema that has been marked in the sample text is stored as an end point of an arc. Step 64 of FIG. 14 is represented by the flow chart of FIG. 13 as has just been described, the sample text being segmented into arcs at each Y-extrema and stored. Each arc is further examined to determine if the arcs segmented at each Y-extrema should be further broken down into additional arcs.

In a first pass, each arc is tested for turning points. If a single arc does not contain turning points as checked in step 66, then the arc is determined as being a single correct arc. It is not segmented into two different arcs and the program proceeds to step 76. However, if the arc does contain turning points, further tests are performed to determine whether the arc should be segmented into one or more additional arcs.

Turning points are defined as points where the angle between successive input vectors is greater than some specified value. The specified value may be any selected angle, preferably 90° or 60°, though others may be used.

In the interest of computer speed and efficiency, turning points are found by comparing the sum of the squares of two successive vectors to the square of a vector between the two end points. One vector proceeds from an adjacent prior point into a center point and the other vector exits to the adjacent subsequent point, and a third vector directly joins the two outer points on either end. If the square of the vector from the two points on either side is less than the sum of the square of the vectors into and out of the center point, the angle is determined to be less than 90°. The point is a turning point if the angle is above 90° for a 90° threshold. If the square of the vector between the end points is less than two-thirds of the sum of the squares of the vectors into and out of the center point, the angle is less than 60°. Other angles may be chosen using the same general scheme. If a turning point is found using the above-specified steps as tested in step 66, the arc is segmented in step 70 into two new arcs. One arc consists of the points from the start of the original arc up to the turning point and the other arc going from the turning point up to the final point of the original arc.

Each arc is then tested to determine if the arc contains inflection points. Inflection points are points where the curvature of the stroke changes from clockwise to counterclockwise or vice versa. If the arc does not contain inflection points as tested in step 72, the arc is not segmented and the determination of arc data advances immediately to step 76. However, if the arc does contain inflection points, the arc is segmented into arcs at the inflection points, as will now be described.

Figure 6:
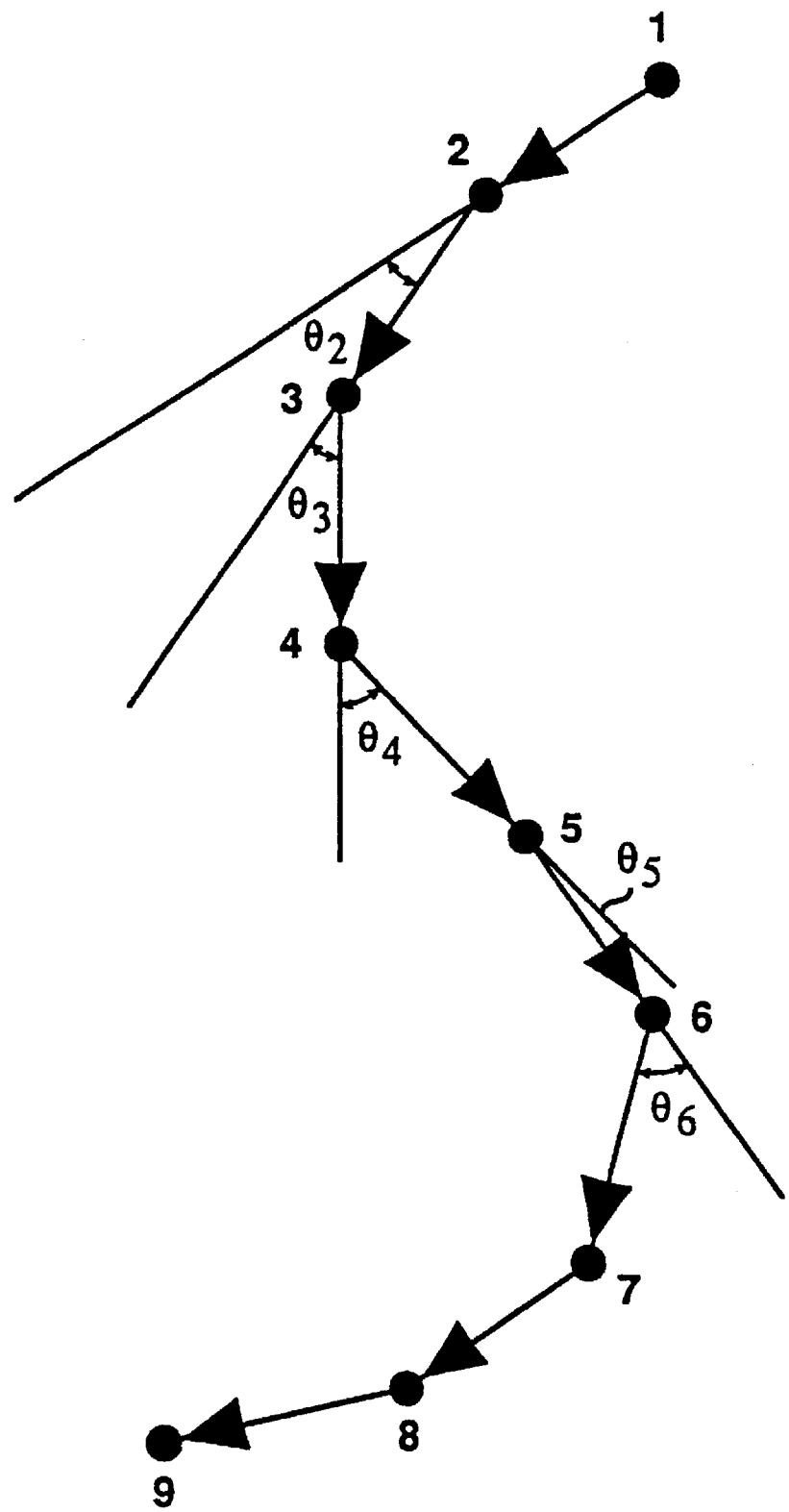
FIG. 6 illustrates the segmenting of a character into separate arcs at inflection points.

The sample curve provided in FIG. 6 is an "S," with the features greatly enlarged for illustration purposes. Using only the prior tests, an "S" is a single arc having a minimum Y value at the top and a maximum Y value at the bottom. If inflection points are not used to further segment the arcs, the letter "S" would be represented by a single arc having one end point at the top of the "S" and the other end point at the bottom of the "S". The arc is segmented to insure that all points between the two end points lie on a single side of a straight line drawn between the end points of the arc.

According to principles of the invention, an inflection point is selected where the curvature changes from a plus direction to a minus direction, or vice versa. The stroke, a sequential set of coordinate points, has already been segmented into arcs based on the Y-extrema of the sample text and turning points between the selected Y-extrema, as previously explained. Each arc containing more than four points is tested to determine if it contains an inflection point.

An inflection point is located by summing the curvature of the arc beginning at the starting point of the arc and proceeding point by point along the arc. If the curvature is all in the same direction, the absolute value of the sum of the curvature will increase until the end of the arc. If the curvature changes, the sum of the curvature will decrease at the change in curvature. The inflection point is selected as the point where the absolute value of the sum is a maximum.

FIG. 6 illustrates how curvature is defined in the selection of inflection points. Curvature is defined as the difference in heading between a vector entering a point and the vector leaving that point. Curvature on one side of the arc is considered positive and curvature on the other side a negative. As illustrated in FIG. 6, the curvature at point 2 is an angle $\theta_2$. The curvature at point 3 is an angle $\theta_3$ and the curvature at point 4 is an angle $\theta_4$. The angles $\theta_2$, $\theta_3$, and $\theta_4$ are all in the same direction and therefore when summed, will increase in absolute value. The curvature at point 5, $\theta_5$, is opposite in sign from the curvature of the previous points. Summing the curvature of point 5 with the curvature of the prior points will cause the absolute value of the sum to decrease. The sum is a maximum at point 4. Point 4 is selected as the inflection point. The original arc of 9 points from points 1 to point 9 of FIG. 6 is broken into two arcs, one arc from point 1 to point 4, and the second arc from point 4 to point 9.

Although some preferred embodiments of the present invention include a novel means for calculating curvature from point to point, any suitable method of calculating curvature from point to point is acceptable. According to one embodiment, approximation is used in determining curvature to avoid complicated trigonometric functions which consume computer resources and time. A suitable method is to solve the equation for the cross-product of the vectors entering and exiting from a given point. The cross-product of vectors A and B is defined as:

$$A \times B = |A||B| \sin \theta \qquad (1)$$

For small $\theta$, the sine of $\theta$ approximately equals $\theta$. The approximation of sin $\theta$ to $\theta$ is permissible because the value of θ will be sufficiently small that the approximation is acceptable. Further, because vector A and vector B are roughly the same length as each other, the cross-product of the vectors pair by pair yields the value roughly proportional to the curvature at each point. The vector cross-product by itself is quite simple as given by:

$$A \times B = (Y_2 - Y_1)(X_3 - X_2) - (X_2 - X_1)(Y_3 - Y_2) \qquad (2)$$

Where $(X_1Y_1)$, $(X_2Y_2)$, and $(X_3Y_3)$ are the coordinates of the three sequential points, $X_2Y_2$ being the point for which the curvature is calculated. For a given point, the X and Y coordinates of points on either side are known and equation 2 can easily be solved for θ to determine the curvature at a given point.

To avoid finding inflection points at every minor jitter in the stroke, the inflection point is selected only where the change in curvature exceeds a threshold. The threshold level may be selected as desired and is based on insuring that an inflection point is identified whenever the arc coordinates would crossover a straight line drawn between the beginning point and the end point of a given arc. As is shown in FIG. 6, the inflection point could realistically be selected as points 4, 5, or 6 and achieve the purpose of insuring that all points of the arc lie on the same side of a straight line drawn between the end points of the arc after segmented into inflection points. Likely, the threshold value of change in curvature will be selected such that the change in curvature at point 5 is not sufficiently great to select the previous point 4 as an inflection point. However, the change of curvature at point 6, added to that at point 5, is sufficiently large that the threshold value is exceeded, making the inflection point at which the arc is segmented into two arcs point 5. A cumulative change of 20° to 30° may be selected as an acceptable threshold value.

As shown in FIG. 14, step 74, if the arc contains inflection points, the arc is segmented into new arcs. The end point of each arc after segmenting at an inflection point is a Y-extrema on the arc. As can be seen from viewing FIG. 6, for an arc beginning at point 1 and ending at point 5, the first point 1 is a Y-extrema minimum and the second point 5 is a Y-extrema maximum. Similarly, for the second arc, the point 5 is a Y-extrema point minimum and the point 9 is a Y-extrema maximum. (Recall that for the X-Y digitizing tablet according to one embodiment of the invention, Y is minimum near the top and increases from the top, to the bottom.)

Next, the end points of the arc are checked to determine if adjacent arcs should be combined into a single arc in step 76. Adjacent arcs are combined into a single arc if the individual arcs are generally horizontal or merely represent jitter in the stroke.

Figure 9:
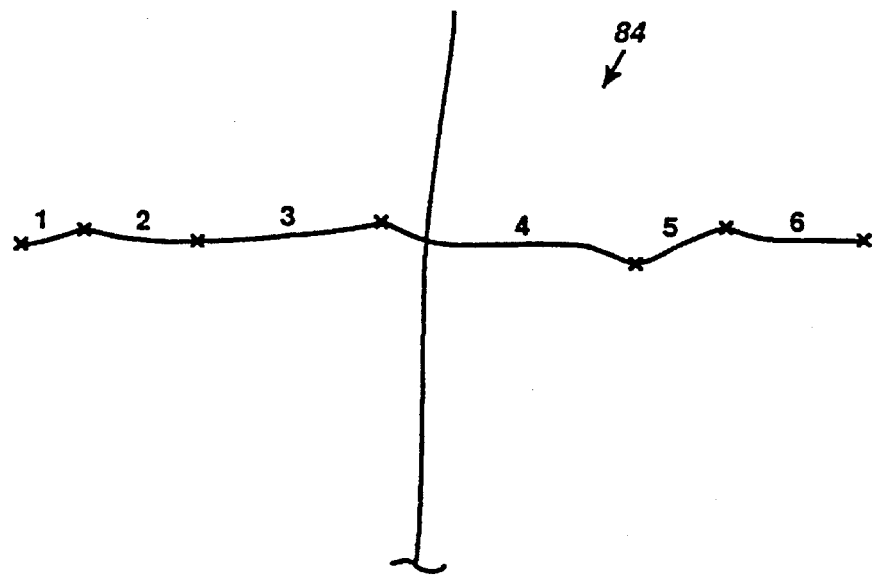
FIG. 9 is an example of sample text that includes a relatively straight line having a plurality of local extrema.
Figure 10:
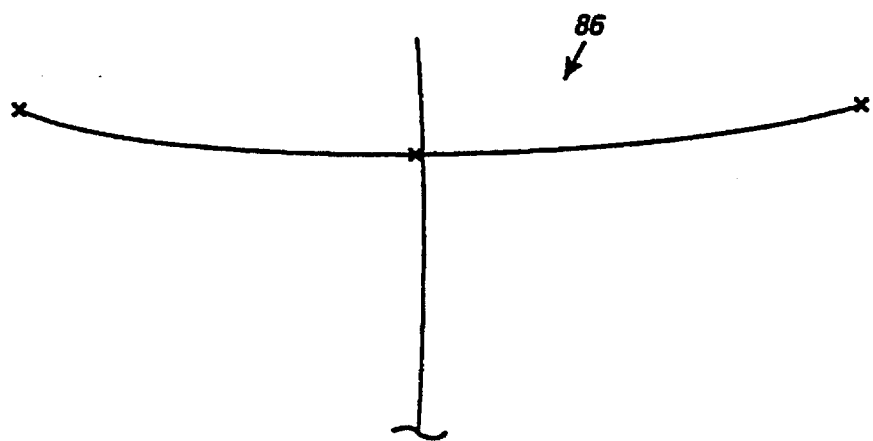
FIG. 10 is an example of sample text that includes a relatively straight line having a false extrema.

FIGS. 9 and 10 illustrate the crossbar of a "t". As shown in FIG. 9, the crossbar of the "t" is segmented into six different arcs, an x marking the beginning and ending points of each arc. This illustrates a stroke that is nearly horizontal and includes several uninteresting local extrema due to minor jitter. The extrema are removed which have a Y value within a threshold delta value of the extrema on either side. The threshold value delta is generally not the same value as used for ε in the smoothing procedure. For example, the threshold value delta looks only at the Y coordinate and not at the total distance between points based on the X and Y coordinates.

Viewing FIG. 9, the Y-extrema between points 2 and 3 can be seen as separated from the extrema on either side only slightly, perhaps by difference of 1 or 2 at most. Similarly, the extrema between arcs 1 and 2 and arcs 3 and 4 can be seen as only minor excursions from the Y-coordinate value of the extrema on either side. These Y-extrema are therefore removed from the data because they are within delta of the Y-extrema on either side. When the Y-extrema are deleted, new arcs are formed based upon the presently existing Y-extrema. The deleting of arc end points within delta of each other continues for all arcs in the sample text. Only arcs which approximate nearly horizontal lines will have points along the line that have a just higher or lower Y-coordinate value and thus will be the only ones affected by this combining of arcs.

Figure 11:
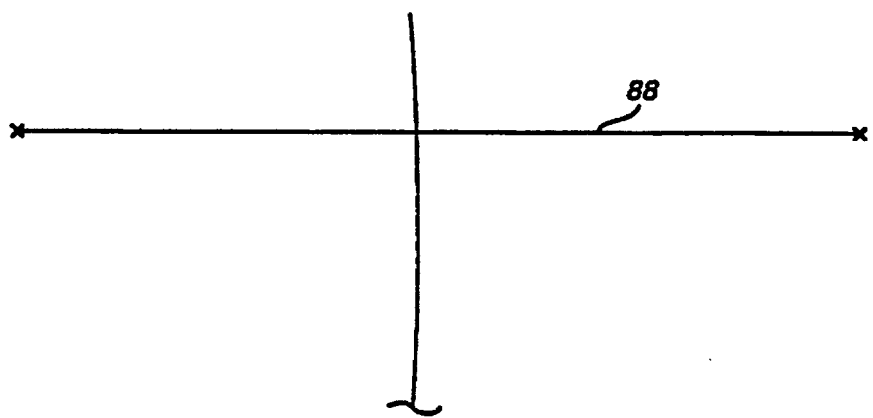
FIG. 11 is the digital form of the arc data for the lines of FIGS. 9 and 10 with the local and false extrema removed.

FIG. 10 illustrates a generally horizontal line having a slight curvature, but which is intended to be a straight line, such as the cross of a "t". It is not uncommon for a person crossing a "t" to slightly dip the stroke in the middle and have a peak at each end. For some writers, the dip is sufficiently pronounced that the Y-extrema at the valley of the arc is not within delta of the Y-extrema at either end. The two arcs would therefore not be affected using the previously described technique of deleting local Y-extrema caused by jitter. The curvature of adjacent arcs is preferably tested to determine if the arcs should be combined. The angle of an arc vector going into a point is compared to the angle of an arc vector going out of a point. If the two vectors are relatively flat, then the two arcs are combined into a single arc, as illustrated in FIG. 11. The angle of adjacent vectors for two arcs having a common end point is tested against the horizontal flatness value and the arcs combined if the angle is flatter than some threshold value. This has the effect of combining adjacent arcs which approximate a straight line, resulting in an arc similar to that shown as arc 88 of FIG. 11. The flatness of an arc vector extending from one end point of an arc to the other end point of the arc should not be confused with the determination of turning points, which are determined based on vectors extending from point-to-point within a single arc, rather than from the end points of two arcs.

FIG. 11 illustrates the new arc from FIGS. 9 and 10 after the local extrema and false extrema have been deleted and after the adjacent arcs have been combined into a single arc. The arc of the cross of a "t" is a generally straight line having arc end points at each end of the horizontal line. Often, the corrected stroke will not be perfectly horizontal because, based on the resolution of the tablet, one end will be some Y value slightly higher or lower than the other end of the horizontal line, thus placing the maximum Y value of the arc at one end and the minimum Y value of the arc at the other end. However, for some sample text, the line may be a perfectly horizontal line in which the coordinate points at each end have the same Y value. The arc segmentation test is satisfied for such an arc because each end point is at a Y-extrema value of the arc. That is, no point on the arc has a greater value than one of the end points and no point on the arc has a lower value than the other of the end points. This may lead to the peculiarity of two successive maxima or minima, the maximum and minimum Y-coordinate points on the arc having the same value, which is permissible in this preferred embodiment.

In addition to the end points of each arc, the general shape of the arc between the two end points is determined and saved. In one preferred embodiment, the center of gravity of the arc between the two end points is saved as a descriptive feature of the arc shape. Alternatively, points at various locations on the arc may be saved as descriptive of the arc shape. For example, points one-third between either end of the end points of each arc may be saved. Alternatively, a midpoint and a curvature point could also be saved. Any technique which properly and satisfactorily describes the shape of the arc between the two end points is suitable according to principles of the invention. Calculating the center of gravity of the arc and storing it as a single point descriptive of the arc shape has been found particularly useful according to principles of the invention and therefore will be described in more detail.

The center of gravity of the arc can be determined by any one of many suitable methods. Three different methods have been tested and found suitable to calculate the approximate center of gravity of an arc. These three methods are as follows: calculate the center of gravity of the data point mass of the smoothed out data points that make of the arc; calculate the center of gravity of the line segment mass for lines that approximate the arc; and calculate the center of gravity of the area under of the arc by approximation to polygons. Each of these three methods will now be described.

In one embodiment, the center of mass of the arc is approximated as equal to the center of mass of the data points making up the arc. All points in an arc from the smoothed data are averaged together and the average point is determined to be the center of gravity of the arc. Averaging of the arc points is carried out by summing the X values of the coordinate point in the arc, dividing the sum by the number of coordinates in the arc, and using the quotient as the X value of the coordinate for the center of gravity. The Y value of the coordinate for the center of gravity is similarly obtained by summing the Y value of the coordinates of each data point of the arc, dividing the sum by the number of coordinates in the arc, and using the quotient as the Y value for the coordinate at the center of gravity. The center of gravity of the data points will not exactly equal the center of gravity of the arc, though it is a close approximation. Calculating the center of gravity of the data points is simple and quick from a computation standpoint and sufficiently accurate, so that it is the preferred method.

The center of the gravity of the arc may alteratively, and slightly more accurately, be calculated from line segments which approximate the shape of the arc. According to this method, straight lines are formed between the points that comprise the arc. The straight lines are weighted based on their length and location and the center of gravity for the arc using the mass of the lines is determined. Alternatively, and slightly more accurate, the mass of small polygons which approximate the mass and shape of the arc may be used to calculate the center of gravity of the arc. Calculating the center of gravity of line segments or a group of adjacent polygons that represent an arc is straight forward from a mathematical standpoint for a given arc and need not be described in detail here because it is found in basic math text books and is within the level of ordinary skill of the art. Both methods could be used to determine the center of gravity of the arc according to principles of the invention. However, both require more computer time and, while yielding slightly more accurate results than the point mass method, are sufficiently complex that approximation of the center of gravity of the arc using the point mass is preferred for on-line recognition.

Use of a single point at the center of gravity of the arc has been found suitable and sufficiently accurate to characterize the shape of the arc. Each arc can thus be represented by only three data points, significantly decreasing the data which must be analyzed for recognition. The arc coordinates are stored as a representation of the sample text for the word "disgrace," is shown in Table 3.

TABLE 3

| ARC COORDINATES DATA | | | | | | | |
|---|---|---|---|---|---|---|---|
| 500 | 174 | 562 | 191 | 616 | 200 | 765 | 178 |
| 498 | 166 | 559 | 185 | 647 | 185 | 791 | 167 |
| 492 | 161 | 570 | 192 | 671 | 160 | 794 | 170 |
| 476 | 175 | 581 | 196 | 677 | 169 | 793 | 174 |
| 466 | 195 | 592 | 191 | 676 | 180 | 789 | 166 |
| 503 | 166 | 603 | 184 | 672 | 188 | 784 | 161 |
| 536 | 118 | 613 | 172 | 676 | 196 | 775 | 178 |
| 517 | 154 | 625 | 166 | 705 | 180 | 781 | 194 |
| 502 | 196 | 630 | 172 | 738 | 164 | 813 | 183 |
| 526 | 186 | 630 | 178 | 738 | 169 | 833 | 162 |
| 540 | 168 | 627 | 170 | 737 | 174 | 820 | 177 |
| 534 | 184 | 623 | 162 | 734 | 166 | 823 | 194 |
| 534 | 195 | 611 | 176 | 728 | 161 | 836 | 190 |
| 549 | 187 | 611 | 194 | 717 | 175 | 846 | 186 |
| 563 | 179 | 625 | 187 | 713 | 192 | 702 | 181 |
| 571 | 168 | 633 | 175 | 728 | 186 | 558 | 142 |
| 580 | 161 | 622 | 211 | 740 | 170 | | |
| 578 | 182 | 598 | 248 | 738 | 181 | | |
| 564 | 196 | 594 | 224 | 738 | 192 | | |

In Table 3, each arc is stored sequentially as three points: the first point, the center of gravity point, and the end point. The end point of one arc is the first point of the next arc and therefore this point need only be stored once. Viewing Table 3, the first arc has a first end point 500,174; a center of gravity point of 498,166; and a second end point at 492,161. This arc is representative of the pen traveling on the first part of the curve letter "d", marked as arc 42 in FIG. 3 The second arc has a first end point of 492,161; the center of gravity of 476,175; and a second end point of 466,195. This arc is shown as arc 44 of FIG. 3. A line is drawn from the center of gravity to the center of a straight line connecting the two end points of the arc to illustrate how the center of gravity provides an indication of the curvature of the arc and its general shape relative to the two end points. The connecting straight lines are provided for illustration purposes to demonstrate how the arcs are characterized. The third arc 46 is a single arc extending from the base 48 of the letter "d" of FIG. 2 to the peak 36 of the letter "d". This arc has 538,118 as one end point; 502,196 as the other end point at the top of the d; and 517,154 as the center of gravity. From the top of the "d" to the bottom of the connecting point 50 between the d and the i is also a single arc. The segmenting of the sample text into a plurality of arcs and the data coordinates representing these arcs for the word "disgrace" is shown in Table 3.

All invisible arcs in the sample text are segmented and the features extracted in the same manner as the visible arcs. An invisible arc is segmented at the points where the pen leaves the paper and again touches the paper to begin the next sample text. Invisible arcs are thus easily created, they having only two points, the beginning point and the end point. Of course, an invisible arc will have no turning points or inflection points because it is necessarily a straight line. The center of gravity of an invisible arc is at the midpoint on a straight line between the beginning and ending points. The features of the invisible arc are stored in the same database with the visible arc, the beginning and ending points and center of gravity being stored and a flag being set indicative of the arc being an invisible arc.

The calculation of the center of gravity point for the arc, step 80, can begin while the sample text is still being entered. It will be appreciated that the Y-extrema are identified and the initial segmentation into two arcs at the Y-extrema in step 64 occurs virtually simultaneously with the data being input from the X-Y data tablet. A computer is able to perform the tests on the data, including the checking of arcs for segmentation into additional arcs and the combining of adjacent arcs, more rapidly than a user is able to write. Thus, for a given sample character, the final arc segmentation occurs shortly after the character is completed and while the user is continuing to generate further sample text by writing the next character. The arc feature points, namely the coordinates of the end points and the coordinates of the center of gravity, are thus stored in step 82 and recognition of a character begins while additional input sample text is being received and segmented into arcs.

Having described the details of the fundamental operating characteristics of segmenting the characters into arcs, it will be understood that recognition is carried out by comparing the arcs to sample characters. Block 30 of FIG. 12 represents a very general function of overall character recognition. Dynamic programming by comparing the arcs of the sample text to the referenced text may be carried out to perform the character recognition, as described in U.S. Pat. No. 4,701,960. Alternatively, the recognition technique, as described in an IBM Research Report entitled "An Adaptive System for Handwriting Recognition" by C. C. Tappert, RC11175, (#50249) May 21, 1985, Computer Science, pages 1–15, may be used. A suitable technique is also disclosed in U.S. Pat. No. 3,111,646, to Harmon, each of the listed references being incorporated herein by reference. It is of course noted that using the present inventive system of segmenting the character into a plurality of arcs permits the character recognition to begin shortly after the segmentation occurs without waiting for the entire sample text to be input. Using a base line of the sample text and other well known tracking techniques may also be used as part of the recognition system, as described in those publications incorporated herein by reference.

One illustration of character recognition is provided as an example of an acceptable recognition technique, according to a preferred embodiment. Dynamic matching of the arcs in the sample text with arcs comprising reference characters is used to select a best match. Dynamic programming per se in the art of character recognition is well known. See, for example, U.S. Pat. No. 4,701,960, to Scott, which describes dynamic programming to provide a best match between sample text and referenced text.

According to one embodiment of the invention, the sample arcs and combinations thereof are scaled to a standard size prior to comparing them to the reference characters. The reference characters are scaled to a standard size when stored and the arcs are scaled to this same standard. Any suitable technique may be used to scale the sample arcs to the standard size. According to one technique, the sample arc is scaled to fit exactly into a box measuring 100 units on each side, with the arc touching one or more sides of the box. The sample arc, or combined sample arcs, are linearly expanded or contracted in the horizontal or vertical dimensions to be exactly within the box that is 100 units on each side. Alternatively, the arcs may be scaled radially based on a center point as next described.

An arc or combined arcs are scaled radially based on a center point as follows. The center of the arc or collection of arcs is determined using techniques previously described here with respect to the center of gravity. A center point of the strokes is thus provided. The distance of each point from the center point is measured and stored. The average radius of the arc from the center point is also determined. The arc can now be scaled to force the average radius to any selected value by scaling the points radially from the center point. For example, if an average radius of 50 units is desired (a character roughly 100 units across), the average radius is forced to 50 units by scaling each point radially from the center point for 50 units. The character can be scaled to any desired size by scaling the location of each point from the center to provide a desired average radius. Radial scaling from a center point improves recognition over that possible with pure linear scaling in the horizontal or vertical directions and is thus preferred. In addition, for a single arc, the center is provided in the stored data and need not be separately determined so that the scaling and subsequent recognition is performed very quickly. Radial scaling is thus particularly advantageous according to principles of this invention.

Recognition is carried out by treating each arc as a single character, comparing each arc to each full reference character, and calculating a numerical score indicating the degree of match between that arc and each reference character. Each arc is then combined with adjacent arcs to form combinations that are scaled and compared to the reference characters.

Numerous techniques are acceptable for providing a numerical score of the degree of match between a sample arc and a reference character. One suitable technique is to provide a score based on the difference in location between the end points and center of gravity of the arc and the end points and center of gravity of the reference characters.

After each arc is scaled and compared to each sample character, the adjacent arcs are scaled and compared to each reference character and a score provided. As the next step of the dynamic programming technique, the adjacent arcs are combined into a single character, scaled as if one character, and compared to each sample character. A numerical score is provided based on the closeness of the match of the combined arcs. Next, the third arc of the sample text is scaled and compared to each reference character and a numerical score provided, indicative of the closeness of the match. The third arc is then combined with the second arc, the combination scaled, and compared to each of the reference characters. The third arc is next combined with the previous two arcs, the combination scaled, and compared to the reference characters. The comparing of arcs alone and in combination with all prior arcs continues for the sample text against each reference character. The score of each combination of the reference characters to the sample characters are saved based on dynamic programming techniques, as is well known in the art. The combination of arcs which provides the best scores for matching against reference characters are selected and a code representing the matching reference character is output. The just described technique of matching individual strokes and various sequences of strokes to determine the correct recognition choice for a letter and/or word, is described in some detail in the previously listed IBM Research Report by C. C. Tappert, RC11175, and need not be further described given this publication.

Because most reference characters are composed of more than one arc, the best matches will likely be made when two or more arcs are combined, scaled, and compared to the reference character. When the arcs are combined to form a single character, the center of the combined arcs is calculated to scale the sample character radially. Similarly, if three or more arcs are combined, the combined set is radially scaled as a single character using the techniques as described. Because the entire reference character is scaled to the selected size, the match between a scaled single arc and the entire reference character will be very poor. When the arcs are properly combined to form a single reference character and scaled to the selected size, the match is quite close. For incorrect combinations of arcs that form less or more than a complete reference character, the scaling of the combination to the selected size will likely be a poor match to a complete reference character. The use of arcs as concrete units and combining them to form whole characters is therefore helpful in performing accurate recognition of the sample text.

Marking an arc whether it is visible or invisible provides useful information for the character recognizer. The character recognizer may use the status of the arc to determine the starting and ending points of words in pure cursive text, or the starting and ending points of characters in mixed discrete and mixed cursive printed characters with some run-on cursive or connective characters. The character recognizer may also use the status of the arc, whether invisible or invisible, to determine where the sample text includes delayed stroke characters such as the cross of a "t" or the dots on an "i" or "j" or the like.

Prior to or as a part of performing dynamic programming for character recognition, the sample text may be separated into discrete characters. Dividing the sample text into individual characters may be carried out in the same step as obtaining the best match for recognition data with dynamic programming. Alternatively, the ligature between characters may be identified and the arc representing the ligature eliminated from the recognition routine of characters; see, for example, U.S. Pat. No. 4,024,500, FIG. 1A, as described in columns 7 and 8, describe a suitable technique for identifying and eliminating the ligature connecting one character to another.

Figure 4:
FIG. 4 is the sample text of FIG. 1 reconstructed from the arc data.

FIG. 4 is a sample character reconstructed from the arc data, illustrating that the arc data provides sufficient data to identify the character. The reconstruction is provided for illustration purposes only; indeed, the sample text will generally not be reconstructed during the operation of the invention, the data being used to recognize and identify the characters rather than reconstruct the characters. The sample text for FIG. 4 is reconstructed using a well known technique known as an affine transform. The affine transform is a well known transform in the mathematical art, and those of ordinary skill in the art would be able to generate the sample text of FIG. 4 from the arc data using standard affine transform techniques. As defined in a technical dictionary, an affine transform is a function on a linear space to itself, which is the sum of a linear transformation and a fixed vector. Generating shapes from data points using affine transforms is described in an article entitled "A Better Way to Compress Images", by Barnsley et al., January, 1988 of Byte Magazine, pp. 215–223. Reconstruction of the sample text from arc data can be carried out by transforming a standard arc to the position of the actual arc using the arc data.

Figure 5:
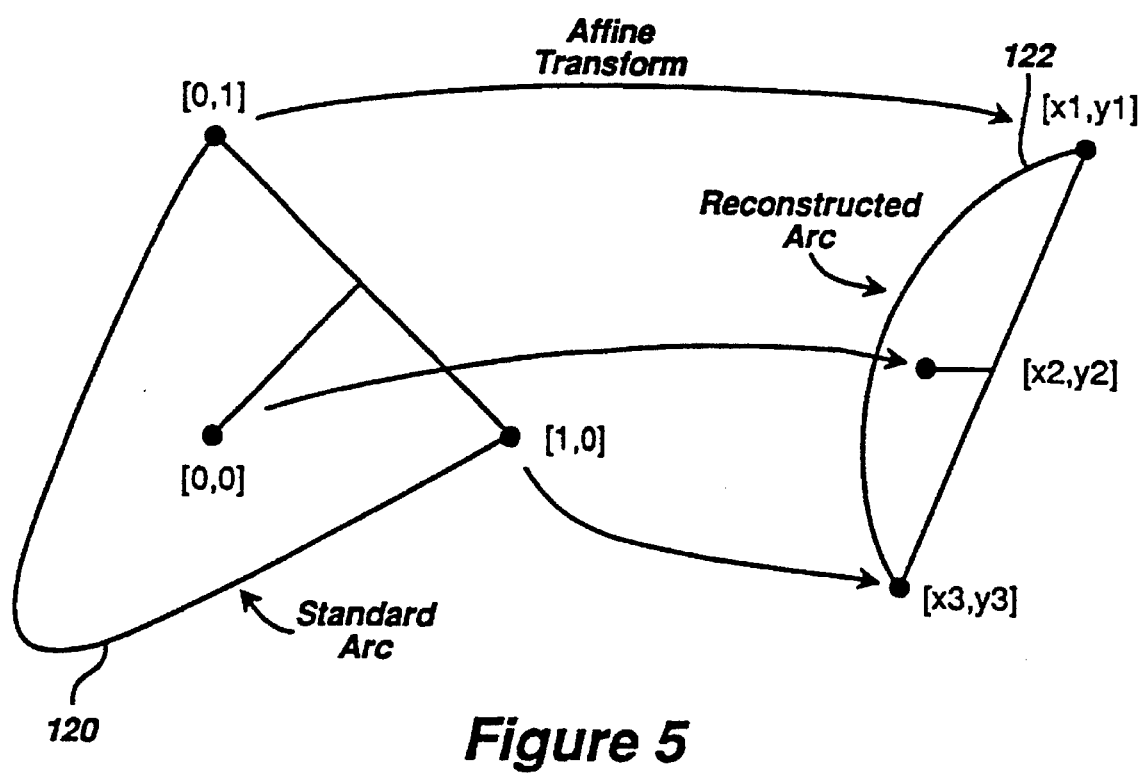
FIG. 5 illustrates the reconstruction of the sample text from arc data.

FIG. 5 illustrates a standard arc 120 having two end points and an arc shape extending a linear amount based on the center of gravity being the peak of an isosceles triangle. Then, an affine transform is computed that maps the end points and the center of gravity of the standard arc to the end points and center of gravity of the arc to be reconstructed. This transformation is applied to the points that make up the standard arc, the transformed points constituting the reconstruction to the sample text.

The reconstruction is remarkably accurate, as may be seen by comparing the reconstructed FIG. 4 with the original data of FIG. 2. A suitable standard arc is defined by seven points, though more points, such as nine, eleven or the like may be used or, fewer points. Assuming that the center of gravity of the standard arc is at 0, 0 simplifies the computation of the constants for the affine transform. The shape of the standard arc 120 is modified to become the reconstructed arc 122 based on the difference between the center of gravity point for the reconstructed arc and the center of gravity point assumed for the standard arc. Similarly, the end points and shape of the arc are modified based on the difference between the end points of the standard arc and the end points of the arc to be reconstructed.

The reconstructed text of FIG. 4 validates the proposition that sufficient data for character recognition has been extracted by calculating arcs beginning and ending at each Y-extrema as explained herein. The extracted data permits accurate character recognition but is sufficiently few data points that recognition occurs rapidly. Importantly, the arc data as stored and used in the recognition step is more user independent than previously possible because those features which uniquely permit recognition are extracted and used and the features that relate more to the writer's style are minimized or ignored. The segmenting of sample data into arcs permits more accurate recognition of handwritten text than previously possible.

A method of organizing handwritten text for character recognition has been described. While most of the examples given are for text as it is written on a data tablet, the principles may be applied to aid in recognition of sample text scanned by an optical character reader, after it is written. All that is necessary is for the data to be presented in an X-Y data form. This data may be obtained by plotting or tracing over a character after it is written, that being equivalent to receiving data input from the path travelled by a writing instrument while the sample text is being written, as was done for the dot on the letter "i". It will be apparent that many variations of the principles taught herein are equivalent and fall within this invention, as defined by the claims. The invention is not limited to the embodiments and combinations described herein and one part of the invention could be combined with another system.

I claim:

1. A computer-implemented method of recognizing a handwritten character comprising the steps of:

inputting into a computer a plurality of data points representing the handwritten character, the data points corresponding to X-Y coordinate points in a path traveled by a handwriting instrument as the character is written, the handwritten character including a first arc having first and second end points;

detecting a change in direction of curvature of the first arc from a clockwise direction to a counterclockwise direction, the change of direction of curvature indicating an inflection point, wherein the detecting step includes:

selecting a first vector heading into a first data point of the plurality of data points of the first arc;

selecting a second vector heading out of the first data point and into a second data point of the plurality of data points of the first arc;

selecting a third vector heading out of the second data point;

computing a first angle between the first and second vectors, the first angle having a positive or negative sign depending on whether the first angle is clockwise or counterclockwise;

computing a second angle between the second and third vectors, the second angle having a positive or negative sign depending on whether the second angle is clockwise or counterclockwise;

determining whether the second angle exceeds a predetermined turning point threshold value;

if the second angle exceeds the turning point threshold value, then segmenting the first arc into second and third arcs at the second data point;

if the second angle does not exceed the turning point threshold value, then determining whether the second angle is opposite in sign to the first angle; and if the second angle is opposite in sign to the first angle, then segmenting the arcs into the second and third arcs at the second data point, the second data point being the inflection point;

segmenting the first arc into second and third arcs at the inflection point, the inflection point becoming an end point in each of the second and third arcs;

determining a representative set of coordinate points for a selected one of the arcs of the handwritten character, the representative set having fewer coordinate points than the selected arc;

comparing the representative set to arcs in a plurality of reference characters; and outputting a representation of a reference character based on a result obtained in the comparing step.

2. The method according to claim 1, further comprising de-hooking and smoothing said data points by:

determining a difference in distance between a point cluster location and a sequentially following data point;

selecting the sequentially following data point as a new point cluster if it is spaced more than a threshold distance from the point cluster location;

averaging the data point's location into the point cluster location if it is spaced less than the threshold distance from the point cluster location; and treating the point cluster locations as individual points in the handwritten character for segmenting the handwritten character into arcs.

3. The method according to claim 1, further comprising:

calculating a flatness value indicative of the flatness of the second and third arcs; and combining the second and third arcs into the first arc if the flatness value calculated is less than a threshold flatness value.

4. The method according to claim 3 wherein the step of calculating a flatness value includes calculating a cumulative curvature value for the second arc and a cumulative curvature value for the third arc and calculating a difference between the cumulative curvature values.

* * * * *